United States Patent
Wu

(10) Patent No.: US 9,664,364 B2
(45) Date of Patent: May 30, 2017

(54) LAMP TUBE MODULE STRUCTURE

(71) Applicant: Cheng-Hsun Wu, New Taipei (TW)

(72) Inventor: Cheng-Hsun Wu, New Taipei (TW)

( * ) Notice: Subject to any disclaimer, the term of this patent is extended or adjusted under 35 U.S.C. 154(b) by 187 days.

(21) Appl. No.: 14/596,180

(22) Filed: Jan. 13, 2015

(65) Prior Publication Data

US 2016/0201856 A1    Jul. 14, 2016

(51) Int. Cl.
| | |
|---|---|
| *F21S 4/00* | (2016.01) |
| *F21V 23/02* | (2006.01) |
| *H05B 33/08* | (2006.01) |
| *F21V 23/00* | (2015.01) |
| *F21K 9/238* | (2016.01) |

(52) U.S. Cl.
CPC ............ *F21V 23/02* (2013.01); *H05B 33/08* (2013.01); *H05B 33/0821* (2013.01); *F21K 9/238* (2016.08); *F21V 23/004* (2013.01); *F21V 23/005* (2013.01)

(58) Field of Classification Search
CPC ...... F21V 23/02; F21V 23/003; F21V 23/004; F21V 23/005; F21V 23/026; F21K 9/238; F21K 9/17; F21Y 2101/02; H05B 33/08; H05B 33/0821
See application file for complete search history.

(56) References Cited

U.S. PATENT DOCUMENTS

| | | | | |
|---|---|---|---|---|
| 8,434,891 | B1 * | 5/2013 | Ham ...................... | F21V 23/06 362/218 |
| 2011/0121756 | A1 * | 5/2011 | Thomas ............. | H05B 33/0809 315/294 |
| 2015/0252955 | A1 * | 9/2015 | Boschetto ............. | F21K 9/1355 362/249.02 |
| 2015/0252958 | A1 * | 9/2015 | Barnetson ............. | F21V 15/015 362/555 |

\* cited by examiner

*Primary Examiner* — Y M. Lee
(74) *Attorney, Agent, or Firm* — Leong C. Lei

(57) ABSTRACT

A lamp tube module structure is configured with at least one DC light-emitting element and a power conversion apparatus in a lamp tube, where the power conversion apparatus comprises a first fluorescent lamp simulation module and second fluorescent lamp simulation module, the first fluorescent lamp simulation module and second fluorescent lamp simulation module respectively have two power input connection ends, and respectively in electric connection with a bridge rectifier in electric connection with said DC light-emitting element. One of the power input connection ends of the first fluorescent lamp simulation module and/or second fluorescent lamp simulation module is configured to electrically connect a capacitor adapted to reduce and isolate the interaction influence of an electric ballast or other kinds of input power sources on a DC component of said lamp tube module.

4 Claims, 2 Drawing Sheets

LAMP TUBE MODULE STRUCTURE

TECHNICAL FIELD OF THE INVENTION

The present invention relates to a lamp tube module structure, and more particularly to a lamp tube structure, aimed at improving conventional lamp tube modules with a direct current (DC) light source, and allowing the reduction and isolation of the interaction influence of an electric ballast or other kinds of input power sources on the DC component of the lamp tube module.

DESCRIPTION OF THE PRIOR ART

LED being used to replace the current popularly-used fluorescent lamp tube has been valued and accepted gradually by all walks of life, and the penetration thereof is also getting higher, because LED is much more energy saving, the life thereof is higher and the electronic technology thereof is developed very well.

Conventional fluorescent lamp tube is provided with electric power through an electronic ballast having a high power factor or a traditional silicon steel ballast generally needing a starter. But, the electric power provided by the ballast cannot be used in a DC light-emitting element such as LED directly such that a power conversion apparatus must be further arranged to convert the power provided by the ballast appropriately, and the converted power is then provided for DC light-emitting element such as LED.

Furthermore, the ballast can not be in direct connection with DC type LED because the output from the ballast is AC power and the ballast is used to overcome the negative resist feature of a gas discharge light source such that a device must be adopted to provide effectively accurately the AC power output from the ballast for the LED needing DC power.

Conventionally, mostly, a power conversion module (AC to DC power module) is mostly arranged to covert AC supply mains to DC power. But, this manner is limited to the characteristics of the elements used, including the quality, dimension, cost and etc of a switch component (e.g. MOS-FET), output filter capacitor (e.g. the life of the electrolyte of an electrolytic capacitor) and transformer, resulting in the influence of the life, efficiency and cost of a lamp tube.

SUMMARY OF THE INVENTION

Thus, the object of the present invention is to provide a lamp tube module structure, aimed at the reduction and isolation of the interaction influence of an electric ballast or other kinds of input power sources on the DC component of the lamp tube module.

One feature of the present invention is configuring a capacitor electrically additionally on a power input connection end based on Taiwan Patent No. M451774, thereby reducing and isolating the interaction influence of an electric ballast or other kinds of input power sources on the DC component of the lamp tube module.

Another feature of the present invention is configuring two capacitors respectively to electrically interconnect two pairs of power input connection ends and bridge rectifier included in a lamp tube module, the bridge rectifier being in electric connection with a DC light-emitting element, thereby allowing the power to be reduced, and furthermore protecting the DC light-emitting element.

In a preferred embodiment, a lamp tube is configured with at least one DC light-emitting element and a power conversion apparatus, where the power conversion apparatus includes a first fluorescent lamp simulation module and second fluorescent lamp simulation module; each of the both first and second fluorescent lamp simulation modules has two power input connection end, and is in electric connection with a bridge rectifier further in electric connection with the DC light-emitting element, where one of the power input connection ends of the first fluorescent lamp tube and/or second fluorescent lamp tube module is configured to electrically connect a capacitor, capable of the reduction and isolation of the interaction influence of an electric ballast or other kinds of input power sources on the DC component of the lamp tube module through the added capacitor.

In another preferred embodiment, a lamp tube is configured with at least one DC light-emitting element and an electric ballast including two pairs of power input connection ends and in electric with a bridge rectifier, where two capacitors are configured to electrically interconnect each pair of power input connection ends and the bridge rectifier, and the bridge rectifier is in electric connection with the DC light-emitting element, capable of the reduction and isolation of the interaction influence of an electric ballast or other kinds of input power sources on the DC component of the lamp tube module, allowing the power to be decreased and furthermore protecting the DC light-emitting element through the added capacitors.

DETAILED DESCRIPTION OF THE PREFERRED EMBODIMENTS

The aforementioned and other objectives and advantages of the present invention will become clearer in light of the following detailed description of illustrative embodiments of this invention described in connection with the drawings. It is intended that the embodiments and drawings disclosed herein are to be considered illustrative rather than restrictive.

Figure 1:
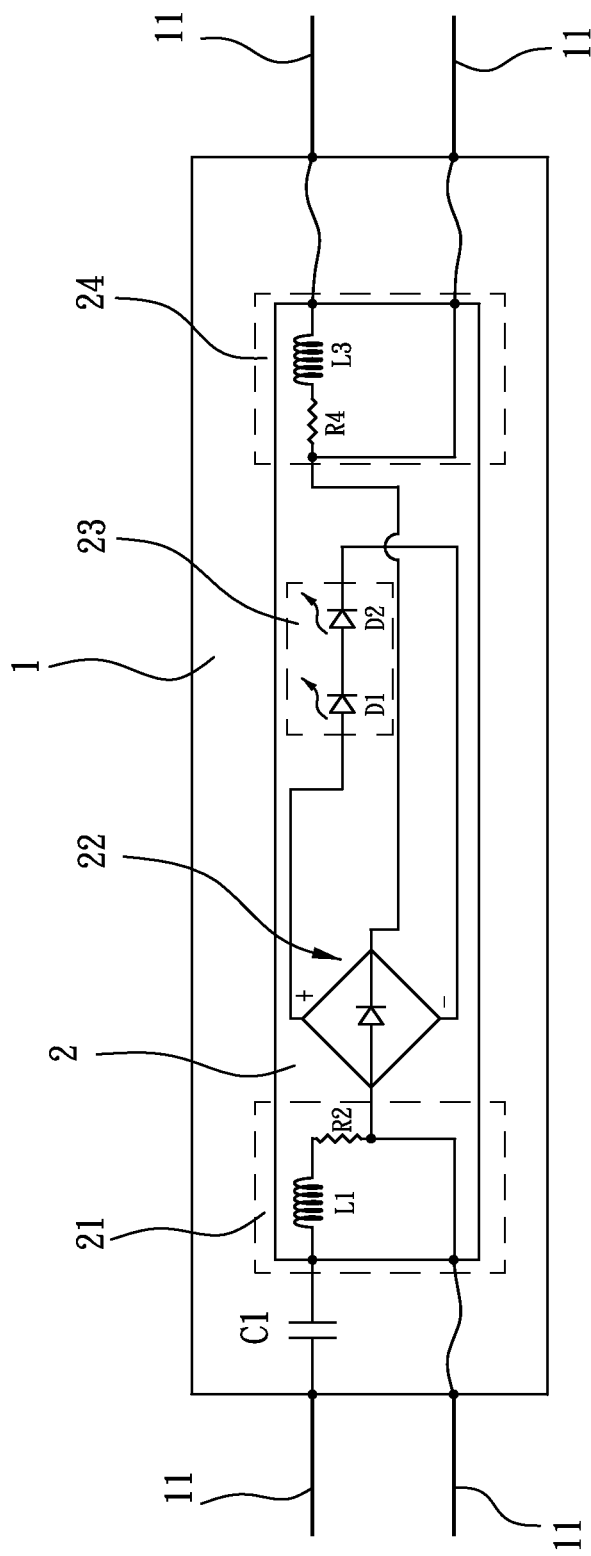
FIG. 1 is a schematic circuit diagram of a first preferred embodiment of a lamp tube module according to the present invention.

Referring to FIG. 1, which is a schematic circuit diagram of a first preferred embodiment of a lamp tube module according to the present invention, a lamp tube module includes a lamp tube 1 configured with a circuit board 2 on which at least one, preferably a plurality of DC light-emitting elements 23 are configured, the DC light-emitting element, the best, is an LED, and the dimension of the lamp tube 1 is conform to the specification of the current fluorescent lamp tube available on the market. The DC light-emitting element is in electric connection with a bridge rectifier 22; the two ends of the circuit board 2 are respectively configured with a first fluorescent lamp simulation module 21 and second fluorescent lamp simulation module 24 which are respectively in electric connection with the DC light-emitting element 23; the first fluorescent lamp simulation module 21, second fluorescent lamp simulation module 24 and bridge rectifier 22 together constitute a power conversion apparatus.

The first fluorescent lamp simulation module 21 may be formed by a resistor R2 in series connection with an inductor L1, and second fluorescent lamp simulation module 24 a resistor R4 in series connection with an inductor L3; the present invention utilizes an electric model constituted by the resistor R2 and inductor L1, and the resistor R4 and inductor L3 to lead out power, where the electric model constituted by the resistor R2, R4 and inductors L1, L2 is low resistance having a value below 1 ohm approximately.

The first fluorescent lamp simulation module 21 and second fluorescent lamp simulation module 24 are respectively connected with a pair of power input connection ends 11 extended out of the lamp tube 1, and power is provided for the lamp tube 1 by connecting the power input connection end 11 to AC mains In the first embodiment of the present invention, one of the power input connection ends 11 of the first fluorescent lamp simulation 21 is configured to electrically connect a capacitor C1 so that the interaction influence of an electric ballast or other kinds of input power sources on the DC component of the lamp tube module, allowing the power to be decreased and furthermore protecting the DC light-emitting element through the added capacitors can be reduced and isolated through the capacitor C1 while current is input into the lamp tube 1 via the power input connection ends 11, allowing the power to be reduced, and furthermore protecting the DC light-emitting element.

Figure 2:
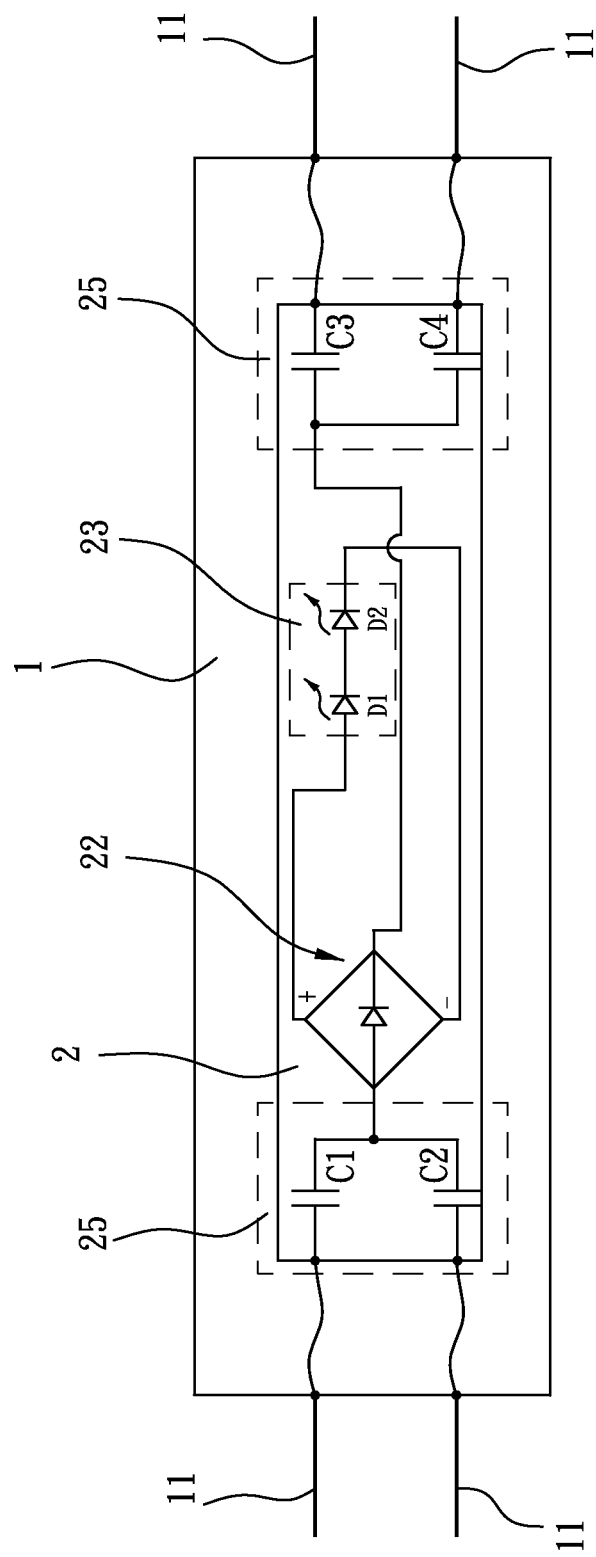
FIG. 2 is a schematic circuit diagram of a second preferred embodiment of a lamp tube module according to the present invention.

Referring to FIG. 2, which is a schematic circuit diagram of a second preferred embodiment of a lamp tube module according to the present invention; a lamp tube module includes a lamp tube 1 configured with a circuit board 2 on which at least one, preferably a plurality of DC light-emitting elements 23 are configure, the DC light-emitting element, the best, is an LED, and the dimension of the lamp tube 1 is conform to the specification of the current fluorescent lamp tube available on the market. Furthermore, a pair of electric ballasts 25, each of which includes a pair of power input connection ends 11. Furthermore, the two electric ballasts are respectively in electric connection with a bridge rectifier 22, and two capacitors C1, C2 and two capacitors C3, C4 are respectively configured to electrically interconnect one of the two pairs of power input connection ends 11 and the bridge rectifier 22, and the other pair of power input connection ends 11 and the bridge rectifier 22. In addition, the bridge rectifier 22 is in electric connection with the DC light-emitting element 23. Therefore, the interaction influence of an electric ballast or other kinds of input power sources on the DC component of the lamp tube module can be reduced and isolated through the two capacitors C1, C2 and the two capacitors C3, C4 while current is input into the lamp tube 1 via the power input connection ends 11, thereby allowing the power to be reduced, and furthermore protecting the DC light-emitting element.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A structure of a lamp tube module, configured with at least one direct current (DC) light-emitting element and a power conversion apparatus in a lamp tube, said power conversion apparatus comprising a first fluorescent lamp simulation module and second fluorescent lamp simulation module, said first fluorescent lamp simulation module and second fluorescent lamp simulation module each having two power input connection ends and comprising a resistor and an inductor connected in series between said two power input connection ends, and in electric connection with a bridge rectifier in electric connection with said DC light-emitting element;

wherein one of said power input connection ends of said first fluorescent lamp simulation module and/or second fluorescent lamp simulation module is configured to electrically connect a capacitor, adapted to reduce and isolate the interaction influence of an input power source on a DC component of said lamp tube module, allowing the power to be reduced, and further protecting said DC light-emitting element;

wherein said DC light-emitting element is connected in parallel with said bridge rectifier and said first fluorescent lamp simulation module, said bridge rectifier, and said second fluorescent lamp simulation module are connected in series with each other, said capacitor being connected in series with said bridge rectifier.

2. The structure according to claim 1, wherein said DC light-emitting element is an LED light source.

3. A structure of a light tube module, configured with at least a DC light-emitting element and an electric ballast in a lamp tube, said electric ballast comprising two pairs of power input connection ends and being in electric connection with a bridge rectifier, two capacitors being configured respectively to electrically interconnect said each pair of power input connection ends and said bridge rectifier, said bridge rectifier being in electric connection with said DC light-emitting element, thereby reducing and isolating the interaction influence of an input power source on a DC component of said lamp tube module, allowing the power to be reduced, and further protecting said DC light-emitting element;

wherein said DC light-emitting element is connected in parallel with said bridge rectifier and said two capacitors of each of said two pairs of power input connection ends are respectively connected to the power input connection ends and parallel to each other, such that said two capacitors are connected in series with said bridge rectifier.

4. The structure according to claim 3, wherein said DC light-emitting element is an LED light source.

* * * * *